United States Patent Office 3,553,588
Patented Jan. 5, 1971

3,553,588
TRANSMITTER PIEZOELECTRIC POWER SUPPLY
William Honig, New York, N.Y., assignor to Loral Corporation, Scarsdale, N.Y., a corporation of Delaware
Filed Sept. 28, 1967, Ser. No. 671,468
Int. Cl. H01v 7/00; H04b 1/04
U.S. Cl. 325—119                                                4 Claims

ABSTRACT OF THE DISCLOSURE

A piezoelectric power supply for generating short duration direct current pulses including a flexible piezoelectric ceramic cartridge, and releasable means for maintaining said cartridge in stressed condition, release of said means permitting said cartridge to return to unstressed condition, thereby generating an electrical pulse.

---

This invention relates generally to the field of electrical pulse generating devices, and more particularly to an improved piezoelectric power supply of small dimensions adapted to be actuated by externally applied pressure to produce a pulse of sufficient power to actuate or directly power electronic circuits, such as oscillators or amplifiers. While the disclosed embodiment is capable of many specific applications, it is particularly adapted for use as a self-contained alarm device which may be randomly scattered in quantity in localized geographic areas.

It is among the principal objects of the present invention to provide a self-contained power supply which requires no batteries or other deteriorable components, whereby the same may have an indefinite shelf life.

Another object of the invention lies in the provision of an improved pulse type power supply in which the cost of fabrication may be of a very low order, with consequent wide sale, distribution and use.

Still another object of the invention lies in the provision of an improved pulse generating device in which the moving parts thereof may be of a relatively simple nature, ideally suited for single use applications.

These objects, as well as other incidental ends and advantages, will more fully appear in the progress of the following disclosure, and be pointed out in the appended claims.

In the drawing, to which reference will be made in the specification, similar reference characters have been employed to designate corresponding parts throughout the several views.

Figure 1:
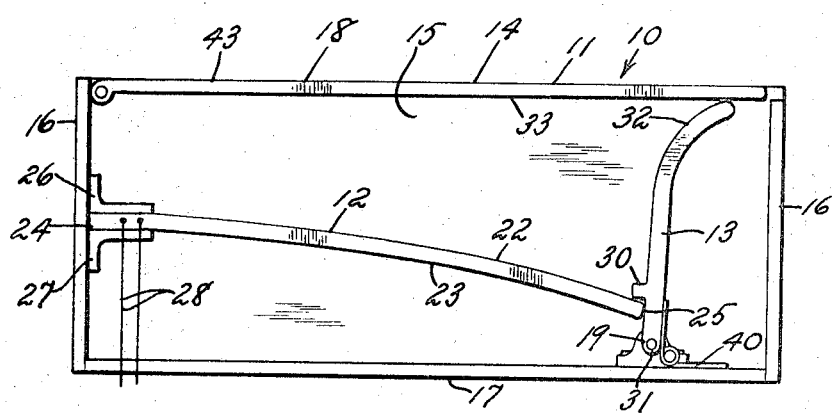
FIG. 1 is a schematic view of a first embodiment of the invention.

In accordance with the first embodiment of the invention, the device, generally indicated by reference character 10, comprises broadly: a casing element 11, a piezoelectric cartridge element 12 and deflecting and triggering means 13.

The casing element 11 may be of any desired configuration, as for example it may be injection molded from synthetic resinous materials wherein an irregular outer surface 14 may resemble a small stone, rock or other naturally occurring article. The casing element 11 includes a generally rectangular cavity 15 disposed therein bounded by side wall 16, a bottom wall 17, and an upper wall 18 which may be interconnected to other portions of the casing element 11 by hinged means 19, or formed to be inherently flexible and integrally attached thereto.

The piezoelectric cartridge element 12 may be of bimorph or multi-morph ceramic type adapted to be mounted as a cantilever. When mounted in this manner, the free end may be deflected almost to rupture, and if the same is suddenly released, a damped pulse with a duration of approximately one millisecond is obtained which may be delivered to load impedances ranging from 10,000 to 50,000 ohms. Depending upon the dimensions of the cartridge, the amount of power available during the pulse may be as high as several hundred milliwatts. In the preferred embodiment, the dimensions of the cartridge are approximately 0.5 to 1.0 inches long, 20 to 100 mils wide, and 15 to 35 mils thick. The duration of the pulse is determined by the resonant frequency of the cantilever beam.

Figure 2:
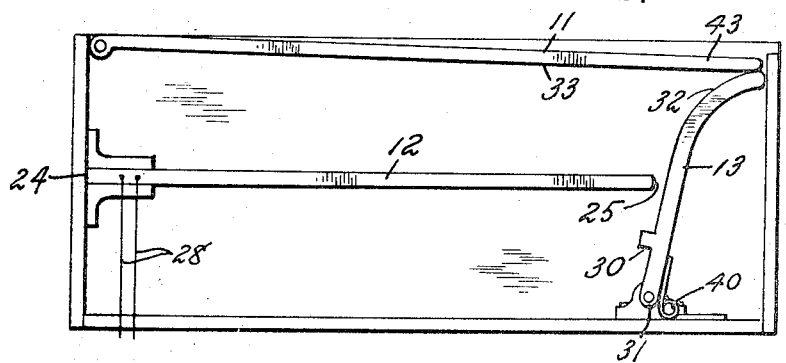
FIG. 2 is a similar schematic view, showing certain of the component parts in altered relative position.

Referring to FIGS. 1 and 2, the cartridge element 11 is generally rectangularly shaped, and is bounded by an upper surface 22, a lower surface 23, a first end 24, and a second end 25. Mounting brackets 26 and 27 are secured to one of the side walls 16, and clamp the first end 24 of the cartridge therebetween. Conductors 28 carry the generated pulse, for amplification, and/or radio frequency propagation, depending upon the contemplated use of the device.

The deflecting and triggering means 13 includes a pivotally mounted sear 30, the lower end 31 of which is anchored to the bottom wall 17. An angularly disposed upper end 32 contacts the under surface 33 of the upper wall 18 to act as a cam follower upon the application of external pressure upon the outer surface 43 of the wall 18, as for example when the device is stepped upon by unauthorized personnel, or run over by a vehicle. A coil spring 40 maintains the sear 30 in engaged position with the free end 25 of the cartridge until the same is tripped.

Figure 5:
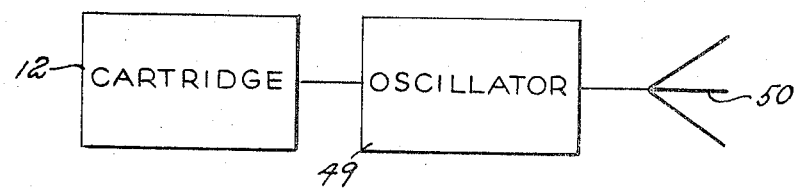
FIG. 5 is a schematic wiring diagram.

Referring to FIG. 5, the signal carried by the conductors 28 may be connected directly to a transistorized oscillator 49 for broadcasting over short distances through an antenna 50, the signal being received by radio frequency receivers for utilization in actuating any of a large number of devices, such as explosive detonators, and the like.

Figure 3:
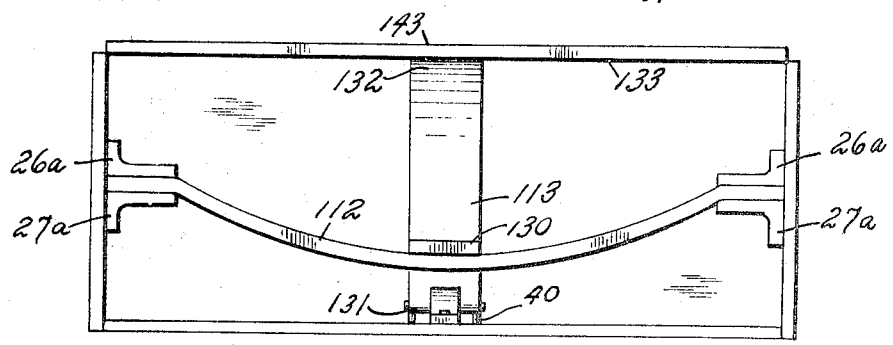
FIG. 3 is a schematic view corresponding to that seen in FIG. 1, but showing a second embodiment of the invention.
Figure 4:
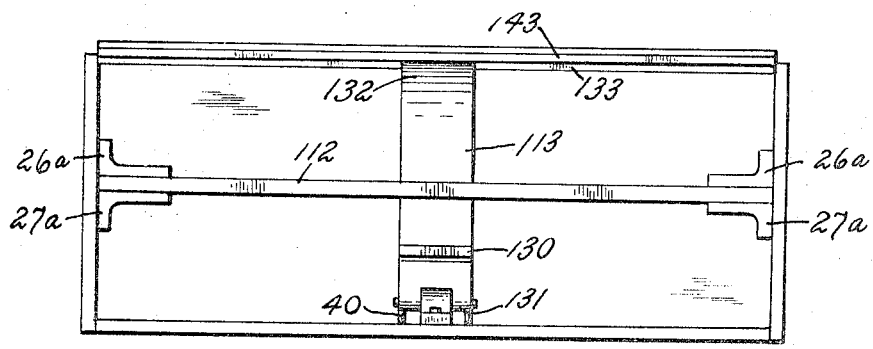
FIG. 4 is a schematic view of the second embodiment corresponding to that seen in FIG. 2.

Turning now to the second embodiment of the invention, as illustrated in FIGS. 3 and 4, parts corresponding to those of the principal embodiment have been designated by similar reference characters with the additional prefix "1."

The second embodiment differs from the first embodiment in the provision of additional mounting brackets 26a and 27a whereby the cartridge element 112 may be secured at both ends, and flexed in the center portion thereof, rather than from one end. This embodiment is suitable when design parameters call for a cartridge of inherently less flexibility due to increased thickness.

If desired, the second embodiment may be modified (by means not shown) to include a ratchet, the teeth of which serially contact an edge of the cartridge element to provide a corresponding series of excursions of the cartridge element, and a series of substantially equal pulses obtained therefrom.

I wish it to be understood that I do not consider the invention limited to the precise details of structure as shown and set forth in this specification, for obvious modifications will occur to those skilled in the art to which the invention pertains.

I claim:
1. Means for providing an electrical pulse for initiating operation of electronic circuits comprising: a casing element including a plurality of walls forming a cavity, a piezoelectric ceramic cartridge of elongated configuration and having first and second ends, means mounting said cartridge at at least one end thereof on an inner surface of one of said plurality of walls, whereby a portion of said cartridge in spaced relation with respect to said end may be flexed within its elastic limit, a deflecting and triggering means including a sear pivotally mounted on a second of said plurality of walls and having an oppositely disposed free end thereof, said sear engaging a free end of said cartridge to maintain the same in flexed condition, a third of said plurality of walls being capable of movement into said cavity upon the exertion of a force on an outer surface thereof, said third wall having an inner surface thereby contacting said free end of said sear to release said free end of said cartridge, said cartridge upon flexing to unstresed condition producing a pulsed current.

2. Structure in accordance with claim 1, said third wall being hingedly connected to the remainder of said casing element.

3. Structure in accordance with claim 1, said cartridge having means mounting the same upon opposed walls of said casing element at both ends thereof.

4. Structure in accordance with claim 1, in combination with radio frequency wave propogation means connected thereto.

References Cited

UNITED STATES PATENTS

| | | | |
|---|---|---|---|
| 2,486,560 | 11/1949 | Gray | 310—8.5 |
| 2,928,052 | 3/1960 | Wood | 331—185 |
| 3,344,314 | 9/1967 | Koontz | 310—8.3X |
| 3,360,664 | 12/1967 | Straube | 310—9.1X |
| 3,456,134 | 7/1969 | Ko | 310—8.5 |

RICHARD MURRAY, Primary Examiner

B. V. SAFOUREK, Assistant Examiner

U.S. Cl. X.R.

310—8.5, 9.1; 325—185